May 4, 1954

R. A. WITTMANN 2,677,418

GAS FUELED PILOT ASSEMBLY AND THERMAL CONTROL ELEMENT

Filed Oct. 23, 1950

Inventor
ROBERT A. WITTMANN

By Lamont Johnston
Attorney

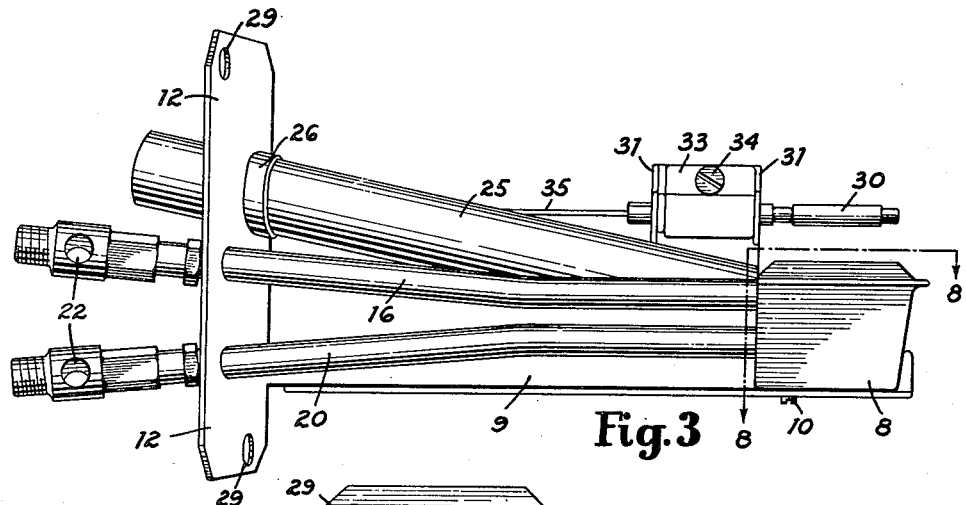
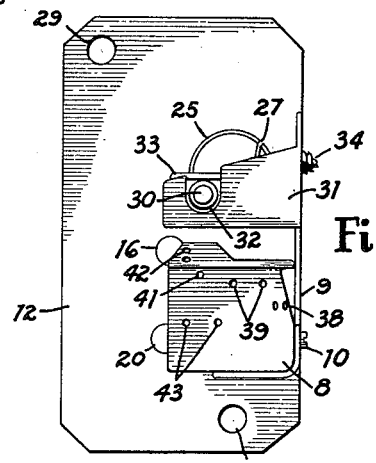
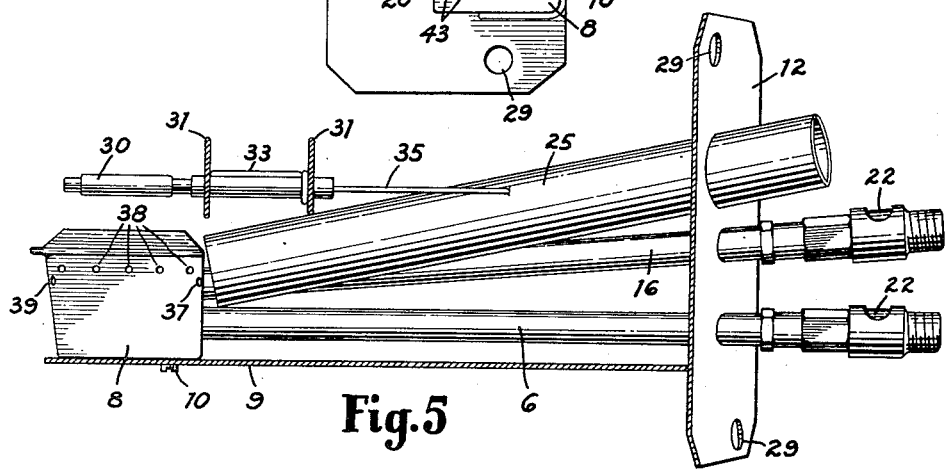

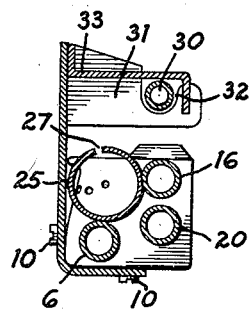
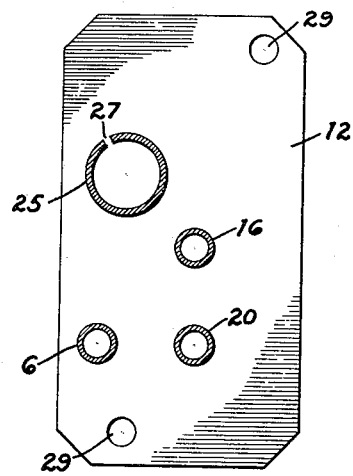
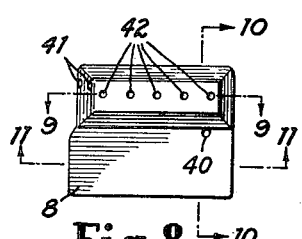
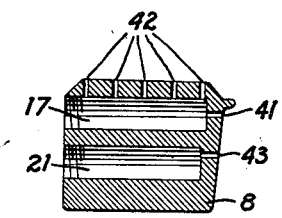
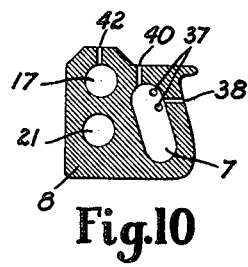
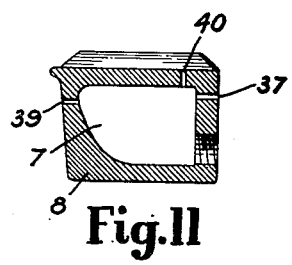

Patented May 4, 1954

2,677,418

UNITED STATES PATENT OFFICE 2,677,418

GAS FUELED PILOT ASSEMBLY AND THERMAL CONTROL ELEMENT

Robert A. Wittmann, Chicago, Ill., assignor of one-half to Hardwick Stove Company, Incorporated, Cleveland, Tenn., a corporation of Delaware Application October 23, 1950, Serial No. 191,515

17 Claims. (Cl. 158—115)

My invention relates to a pilot assembly and more particularly to a compact pilot assembly for use in the oven of a gas stove.

One object of my invention is to provide a pilot assembly of a plurality of pilots, an ignition means and a heat responsive element so constructed that the parts have a permanently fixed relationship to each other.

Another object is to provide an assembly of a plurality of pilots, an ignition means and a heat responsive element in which a pilot flame must be first established at a main burner before the gas which is to heat the heat responsive element can be ignited.

A further object of my invention is to provide a pilot assembly of a plurality of pilots so arranged that each pilot will light all of the other pilots and the main burner and, conversely, the main burner will light all of the pilots.

Still another object is to provide a pilot assembly of a plurality of pilots in combination with piping, a flash tube or electric ignition coil and a heat responsive element, the whole assembly being adapted to be bolted to a combustion chamber wall, thereby holding all of the parts in a fixed position relative to a main burner and permitting ready removal of the entire assembly.

A still further object of my invention is to provide a pilot assembly of a plurality of pilots with their piping in which the primary air injections and all gas orifices will be outside of the combustion chamber.

Another object of my invention is to provide an assembly of a plurality of pilots and a heat responsive element such that the heat applied to the heat responsive element can be supplied from a plurality of sources, thereby distributing the heating gas over an extended surface to obtain the fastest heating possible.

The foregoing and other objects, features and advantages of this invention will be apparent from the following description and from the accompanying drawings of a preferred embodiment, it being understood that the detailed description and drawings are merely illustrative of the invention, which is defined in the claims.

In the drawings,

Figure 3 is a front elevation of the pilot assembly.

Figure 4 is a right end view of the pilot assembly.

Figure 5 is a sectional view on the line 5—5 of Figure 2.

Figure 6 is a sectional view on the line 6—6 of Figure 2.

Figure 7 is a sectional view on the line 7—7 of Figure 2.

Figure 8 is a plan view of the pilot casting, as seen on the line 8—8 of Figure 3.

Figure 9 is a section of the casting on the line 9—9 of Figure 8.

Figure 10 is a section of the casting on the line 10—10 of Figure 8.

Figure 11 is a section of the casting on the line 11—11 of Figure 8.

Like reference numerals refer to like parts throughout the several figures of the drawings.

Figure 1:
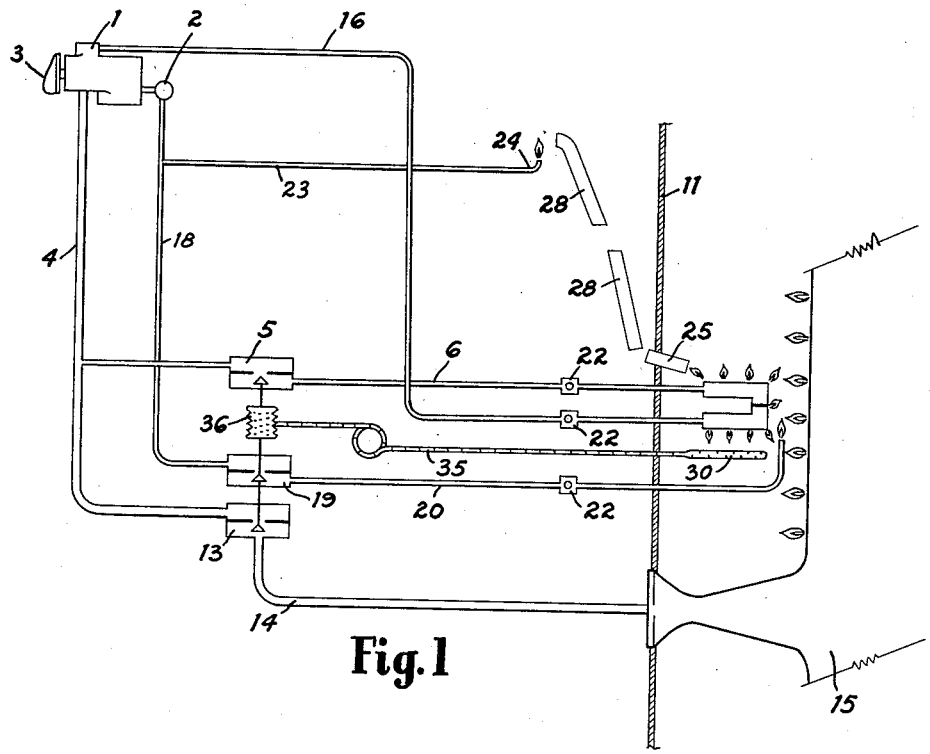
Figure 1 is a diagrammatic representation of a single point ignition system for a gas oven in which a pilot assembly embodying my invention may be used.
Figure 2:
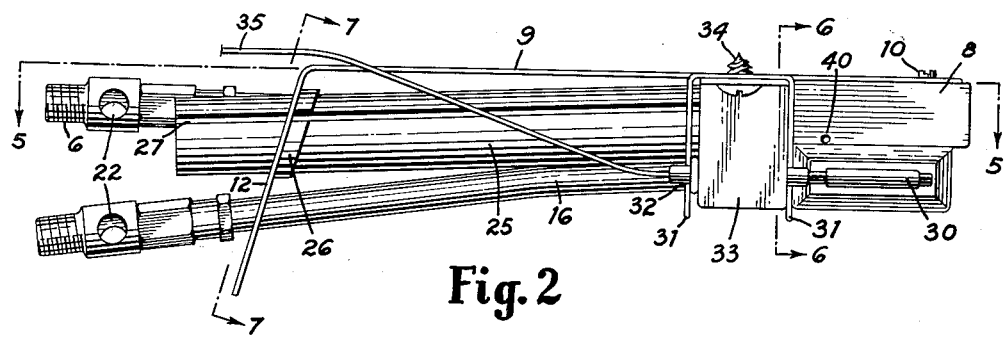
Figure 2 is a plan view of one pilot assembly arrangement made in accordance with my invention.

According to my invention, an oven thermostat 1, receiving a supply of gas from a gas manifold 2, has a control knob or handle 3. When the thermostat is turned to the "on" position, gas flows from the manifold 2 through the thermostat into a supply line 4, from which it passes through a valve 5 and a supply tube 6 to a flash and accelerating pilot chamber 7 in a pilot casting or distributor member 8. The casting 8 is suitably supported by a bracket 9, being secured thereto by bolts 10. The bracket is secured to a wall 11 of an oven or combustion chamber by means of bolts or screws passing through holes 29 in a flange 12 of the bracket, in a position to hold the pilot assembly in close proximity to a main oven burner 15.

The gas supply line 4 also leads to another valve 13 and through it into a supply tube 14 leading to the main oven burner 15.

A separate supply line 16, also leading from the thermostat 1 and being manually controlled thereby, leads to a chamber 17 in the pilot casting 8, this chamber being the supply chamber for a heating or sustaining pilot.

An independent supply line 18, leading directly from the gas manifold 2 and not passing through the thermostat, conducts gas through a third valve 19 and thence through a supply tube 20 into a chamber 21 in the casting 8, this chamber supplying the gas for the stand-by pilot.

Each of the gas supply tubes 6, 16 and 20 may be secured to the casting 8 in any suitable manner, as by being threaded into tapped openings in the casting, and each has an orifice 22 with an adjustable primary air shutter or adjustment in it outside of the oven wall 11. Each of the three inspirators 22 has a small, adjustable orifice in it to control the amount of gas which flows to each pilot.

A small supply line 23 leads from the gas manifold 2 to a top pilot burner 24, which pilot is left constantly burning. As indicated in Figure 1, the line 23 may be taken off the line 18, if desired.

A flash tube 25 is positioned in the pilot assembly with one open end abutting against the rear of the pilot casting 8. The flash tube passes through an opening in the flange 12 of the bracket 9 and thus out of the combustion chamber. Its position relative to the flange may be partially fixed by means of a ring or collar 26, which is fixed to the flash tube in an eccentric or oblique position in any suitable manner, as by welding or soldering. This collar prevents the flash tube from slipping out through the flange and, due to its oblique position, also prevents rotation of the flash tube. The flash tube is held with its one end in contact with the rear of the pilot casting 8 and with its collar 26 in contact with the flange 12 of the bracket. Its end adjacent to the pilot casting is held firmly between the bracket 9, the gas tubes 6, 16 and 20 and one of the arms 31 of the bracket described hereinafter. If desired, the flash tube may have an aerating slot 27 or other aerating means along its entire length or along part of it. One or more additional sections 28 of flash tubing may be used, as necessary, to extend from the tube 25 up to the top burner pilot 24, these additional sections being held in communication with the tube 25.

In place of the combination of flash tubing and top burner pilot just described, electric ignition may, if desired, be used. Such electric ignition comprises a hot wire adjacent to the ports of the flash pilot and in a position to ignite gas coming from those ports.

A heat responsive or thermal element 30 is held in position over the pilot casting 8 by means of two arms 31 which are part of and extend from the bracket 9. The thermal element, which is generally cylindrical in shape, is supported in slots 32 in the arms 31. A clip 33 may be used to extend over an extension of the thermal element 30 and thereby to hold it in place, the clip being fixed to the bracket 9, as by means of a sheet metal screw or bolt 34. A small tube 35 leads from the thermal element 30 to a bellows 36 (Fig. 1). This bellows is secured in the same casting as the valves 5, 19 and 13 and they are all mechanically linked together. When the heat responsive element 30, which may be of the mercury bulb type if desired, becomes heated sufficiently, the expansion of the mercury in the element 30 expands the bellows 36. This action first opens the valve 19, permitting gas to flow through the tube 20 to the stand-by pilot chamber 21. As the mercury is expanded further, the valve 13 is opened, permitting gas to flow to the main burner 15. About the same time, the valve 5 is closed, shutting off the supply of gas through the tube 6 to the flash pilot chamber 7. The ideal operation is to have all three valves function simultaneously.

As may be seen in Figures 10 and 11, the flash pilot chamber 7 has one or more ports 37 in its rear surface, one of these ports directing into the end of the flash tube 25. (See Fig. 5.) When the oven is to be lighted, the oven thermostat knob 3 is turned "on" to any temperature setting. Gas is thereby permitted to flow from the gas manifold 2 through the thermostat 1 into the supply line 4. At this time, the heat responsive element 30 is cold and hence the bellows 36 is contracted and the valve 5 is open, the valves 13 and 19 being closed at this time. Gas from the line 4 flows through the valve 5 and the supply tube 6 into the flash pilot chamber 7 and out through the rear ports 37, as well as through side and front ports. The gas then flows through the flash tubes 25 and 28 up to the top burner pilot 24, where it becomes ignited, the flame flashing back to the pilot casting 8. A series of ports 38 are formed in the side wall of the flash pilot chamber 7, as may be seen in Figures 4, 5 and 10, these ports leading from the vicinity of the ports 37 in the rear of the casting to the front of the casting, in which there is a set of lighting ports 39. The gas in the flash tubes is ignited at the top burner pilot 24 and the flame propagates down through the flash tubes 28 and 25 to ignite the gas coming through the rear ports 37 of the flash pilot chamber. The flame then carries around along the series of ports 38 to the front of the casting, where it ignites the gas coming from the front pilot ports 39. At this time, the pilot is ready to ignite any gas which may be present in the main burner 15, although in normal operation of the oven, there should be no gas in the main burner at this time. One or more accelerating ports 40 may be provided, if desired (as may be seen in Figs. 2, 8, 10 and 11), extending upwardly from the flash pilot chamber 7 through the top surface of the casting 8, in order to furnish a supply of gas to assist in heating the thermal element 30, or to accelerate its reaching its operating temperature.

At the same time as the control knob 3 permits gas to flow through the line 4, the valve 5 and the supply tube 6 to the flash pilot chamber 7, gas is also permitted to flow from the gas manifold 2 through the thermostat 1 and the supply line 16 into the heating pilot chamber 17. This heating pilot chamber has at its forward end one or more ports 41 (Figs. 4, 8 and 9). The gas coming through these ports 41 will be ignited by the flame coming from the front flash pilot ports 39. A series of heating ports 42 in the top surface of the casting 8 are connected with the heating pilot chamber 17 and extend from the front of the casting toward its rear, these ports being in a position below the thermal element 30. The gas coming through the heating ports 42 is ignited by the flame coming from the ports 41. The gas coming through the accelerating ports 40, leading from the flash pilot chamber 7, is ignited by the flame coming from the heating ports 42 and assists the heating ports 42 in heating the thermal element 30, so that the heating of the latter is accelerated.

When the mercury or other heat responsive material in the thermal element 30 is heated partly through its range, the bellows 36 is expanded to open the valve 19, permitting gas to flow through the tube 20 into the stand-by pilot chamber 21, from which it passes through one or more ports 43 in the front of the chamber. The gas coming through the ports 43 is ignited by the flames at the ports 39 or 41. As the thermal element 30 is heated further and the bellows 36 expands further, the valve 13 is opened, permitting a flow of gas in the main burner 15. The gas in the main burner is then ignited by the flames coming from either the pilot ports 39, 41 or 43.

As the thermal element 30 is heated still more and the bellows 36 expands to the fullest extent, the valve 5 is closed, shutting off the supply of gas through the tube 6 to the flash pilot chamber 7. This, of course, extinguishes the flames coming from the ports 38, 39 and 40. The heat of the flames coming from the heating ports 42 is sufficient to keep the thermal element 30 fully expanded and it is logical that such heat will not permit overshooting, with consequent fast cooling.

The sequence of operation of the valves 19, 13 and 5 may be as described above, or they may all be operated together.

When the control knob 3 is turned to the "off" position, the supply of gas through the supply line 4, the valve 13 and the supply tube 14 to the main burner 15 is cut off. The supply of gas through the supply line 4, the valve 5 and the supply tube 6 to the flash pilot chamber 7 has already been shut off by the action of the thermal element 30 and the bellows 36 in closing the valve 5. At this time, gas continues to flow from the gas manifold 2 through the supply line 18, the valve 19 and the supply tube 20 to the stand-by pilot chamber 21 and through its ports 43, thereby maintaining a flame from those ports. The closing of the thermostat valve by the control knob 3 also shuts off the supply of gas through the supply line 16 to the heating pilot chamber 17 and thence through its ports 41 and 42. The supply of gas through the upper accelerating ports 40 of the flash pilot chamber 7 has previously been cut off by the action of the thermal element 30. Thus, when the supply is also cut off from the heating ports 42 of the heating pilot chamber 17, there is no flame heating the thermal element 30. Consequently, the thermal element begins to cool, thus causing the bellows to contract.

This cooling of the thermal element and the consequent contraction of the bellows requires a few moments, so that gas continues to flow through the supply line 18, the valve 19 and the supply tube 20 to the stand-by pilot chamber 21, from whence it goes through the ports 43 and maintains a flame from those ports. The purpose of this provision is to permit the cook readily to turn the main burner 15 on again if she changes her mind about needing the burner shortly after having turned it off. It also protects against malfunctioning of the main burner valve 13. When the thermal element 30 has not had sufficient time to cool and thus the bellows 36 has not fully contracted, the valve 13 in the main burner line is still open, as is the valve 19 in the stand-by pilot line, the valve 5 in the flash pilot line being at the same time closed. Consequently, if the thermostat 1 were suddenly opened shortly after having been closed, gas would flow through the main burner valve 13 into the main burner 15, but could not flow through the flash pilot valve 5, which is closed. Thus, if there were no flame at the stand-by pilot ports 43 a dangerous condition would exist, because a large amount of gas would flow into the combustion chamber before the flash pilot could become operative. This situation is prevented by keeping the gas coming from the stand-by pilot ports 43 for a few moments after the thermostat is turned "off," due to the fact that the automatic valve 19 in the stand-by pilot line remains open.

It will be apparent that I have provided, by my invention, a pilot assembly in which the pilots, the flash tube and the heat responsive element are fixed together in a permanent relationship. The arrangement is such that any one of the pilots will light all of the other pilots and the main burner, and the main burner will also light any of the pilots. The assembly is so made that it can be readily installed or removed from the combustion chamber and can be bolted to the combustion chamber wall, thereby holding all of the parts in a fixed position relative to the main burner. The supply tubes for all of the pilots have all of their primary air injections and all of their gas orifices outside of the combustion chamber, where they are readily accessible for inspection and adjustment.

The pilot assembly is so designed that a gas pilot flame must first be established adjacent to the main burner before the gas which heats the thermal element can be ignited to permit a flow of gas to the main burner. This effects a safety factor because no gas can flow to the main burner unless there is a pilot flame burning. Even after turning the main burner off and turning it back on again, no gas can flow to the main burner without there being a pilot flame burning, because the stand-by pilot flame will be burning whenever gas is permitted to flow to the main burner. This also constitutes a safety factor, eliminating the danger of explosion.

I claim:

1. In a gas burner assembly including a main burner, a pilot burner and a heat responsive element, a pilot assembly comprising a distributor member having a plurality of separate chambers therein, a gas supply tube leading to each of said chambers and a flash tube extending upwardly from the vicinity of a first one of said chambers, at least one port in said first chamber coacting with said flash tube, a series of ports in said first chamber extending from the vicinity of said flash tube to a position in proximity to the main burner, a second one of said chambers having a series of ports therein extending from a position adjacent to said main burner to a position near the heat responsive element, and a third one of said chambers having at least one port adjacent to said main burner.

2. In a gas burner assembly including a main burner, a pilot burner and a heat responsive element, a pilot assembly comprising a distributor member having a plurality of separate chambers therein, a gas supply tube leading to each of said chambers and a flash tube extending upwardly from the vicinity of a first one of said chambers, at least one port in said first chamber coacting with said flash tube, a series of ports in said first chamber extending from the vicinity of said flash tube to a position in proximity to the main burner, a second one of said chambers having a series of ports therein extending from a position adjacent to said main burner to a position near the heat responsive element, said first chamber also having ports adjacent to said heat responsive element, and a third one of said chambers having at least one port adjacent to said main burner.

3. In a gas burner assembly including a main burner, a pilot burner and a heat responsive element, a pilot assembly comprising a distributor member having a plurality of separate chambers therein, a gas supply tube leading to each of said chambers and a flash tube extending upwardly from the vicinity of a first one of said chambers, at least one port in said first chamber coacting with said flash tube, a series of ports in said first chamber extending from the vicinity of said flash tube to a position in proximity to the main burner, a second one of said chambers having a series of ports therein extending from a position adjacent to said main burner to a position near the heat responsive element, and a third one of said chambers having at least one port adjacent to said main burner, at least one port in each chamber being so located as to light the other ports and the main burner.

4. In a gas burner assembly including a main burner, a pilot burner and a heat responsive element, a pilot assembly comprising a distributor member having a plurality of separate chambers therein, a gas supply tube leading to each of said chambers and a flash tube extending upwardly from the vicinity of a first one of said chambers, at least one port in said first chamber coacting with said flash tube, a series of ports in said first chamber extending from the vicinity of said flash tube to a position in proximity to the main burner, a second one of said chambers having a series of ports therein extending from a position adjacent to said main burner to a position near the heat responsive element, said first chamber also having ports adjacent to said heat responsive element, and a third one of said chambers having at least one port adjacent to said main burner, at least one port in each chamber being so located as to light the other ports and the main burner.

5. In a gas burner assembly including a main burner, a pilot burner and a heat responsive element, a pilot assembly comprising a distributor member having a plurality of separate chambers therein, a gas supply tube leading to each of said chambers and a flash tube extending upwardly from the vicinity of a first one of said chambers, at least one port in said first chamber coacting with said flash tube, a series of ports in said first chamber extending from the vicinity of said flash tube to a position in proximity to the main burner, a second one of said chambers having a series of ports therein extending from a position adjacent to said main burner to a position near the heat responsive element, and a third one of said chambers having at least one port adjacent to said main burner, at least one port in each chamber being so located as to be lighted by the main burner.

6. In a gas burner assembly including a main burner, a pilot burner and a heat responsive element, a pilot assembly comprising a distributor member having a plurality of separate chambers therein, a gas supply tube leading to each of said chambers and a flash tube extending upwardly from the vicinity of a first one of said chambers, at least one port in said first chamber coacting with said flash tube, a series of ports in said first chamber extending from the vicinity of said flash tube to a position in proximity to the main burner, a second one of said chambers having a series of ports therein extending from a position adjacent to said main burner to a position near the heat responsive element, said first chamber also having ports adjacent to said heat responsive element, and a third one of said chambers having at least one port adjacent to said main burner, at least one port in each chamber being so located as to be lighted by the main burner.

7. In a gas burner assembly including a main burner, a pilot burner and a heat responsive element, a pilot assembly comprising a distributor member having a plurality of separate chambers therein, a gas supply tube leading to each of said chambers, an ignition means adjacent to a first one of said chambers, a series of ports in said first chamber extending from the vicinity of said ignition means to a position in proximity to the main burner, a second one of said chambers having a series of ports therein extending from a position adjacent to said main burner to a position near the heat responsive element, said ignition means establishing a flame first at the ports adjacent to itself, the flame thence propagating along the series of ports of the first chamber from the vicinity of said ignition means to a position in proximity to the main burner and thence to the ports of said second chamber from those ports adjacent to the main burner to the ports near the heat responsive element.

8. In a gas burner assembly including a main burner, a pilot burner and a heat responsive element, a pilot assembly comprising a distributor member having a plurality of separate chambers therein, a gas supply tube leading to each of said chambers and a flash tube extending upwardly from the vicinity of a first one of said chambers, at least one port in said first chamber coacting with said flash tube, a series of ports in said first chamber extending from the vicinity of said flash tube to a position in proximity to the main burner, a second one of said chambers having a series of ports therein extending from a position adjacent to said main burner to a position near the heat responsive element, said flash tube establishing a flame first at the ports adjacent to itself, the flame thence propagating along the series of ports of the first chamber from the vicinity of said flash tube to a position in proximity to the main burner and thence to the ports of said second chamber from those ports adjacent to the main burner to the ports near the heat responsive element.

9. A gas pilot assembly comprising a distributor member having a plurality of separate chambers therein, a gas supply tube leading to each of said chambers, a flash tube adapted to extend from a pilot flame to the vicinity of a first one of said chambers, and a bracket for supporting said distributor member and said tubes in fixed relationship to each other.

10. A gas pilot assembly comprising a distributor member having a plurality of separate chambers therein, a gas supply tube leading to each of said chambers, a flash tube adapted to extend from a pilot flame to the vicinity of a first one of said chambers, a heat responsive element, and a bracket for supporting said distributor member, said tubes and said heat responsive element in fixed relationship to each other.

11. A gas pilot assembly comprising a distributor member having a plurality of separate chambers therein, a gas supply tube leading to each of said chambers, a flash tube adapted to extend from a pilot flame to the vicinity of a first one of said chambers, a heat responsive element, and a bracket for supporting said distributor member, said tubes and said heat responsive element in fixed relationship to each other, whereby said pilot assembly can be removed and replaced as a unit.

12. A gas pilot assembly comprising a distributor member having a plurality of separate chambers therein, a gas supply tube leading to each of said chambers, a flash tube adapted to extend from a pilot flame to the vicinity of a first one of said chambers, and a bracket for supporting said distributor member and said tubes in an oven compartment of a stove and in fixed relationship to each other.

13. A gas pilot assembly comprising a distributor member having a plurality of separate chambers therein, a gas supply tube leading to each of said chambers, a flash tube adapted to extend from a pilot flame to the vicinity of a first one of said chambers, and a bracket for supporting said distributor member and said tubes in an oven compartment of a stove and in fixed relationship to each other, with the primary air orifices and all gas orifices of said gas supply tubes located outside of said oven compartment.

14. A gas pilot assembly comprising a distributor member having a plurality of separate chambers therein, a gas supply tube leading to each of said chambers, a flash tube adapted to extend from a pilot flame to the vicinity of a first one of said chambers, a heat responsive element, and a bracket for supporting said distributor member, said tubes and said heat responsive element in an oven compartment of a stove and in fixed relationship to each other.

15. A gas pilot assembly comprising a distributor member having a plurality of separate chambers therein, a gas supply tube leading to each of said chambers, a flash tube adapted to extend from a pilot flame to the vicinity of a first one of said chambers, a heat responsive element, and a bracket for supporting said distributor member, said tubes and said heat responsive element in an oven compartment of a stove and in fixed relationship to each other, with the primary air orifices and all gas orifices of said gas supply tubes located outside of said oven compartment.

16. A gas pilot assembly comprising a distributor member having a plurality of separate chambers therein, a gas supply tube leading to each of said chambers, an ignition means adjacent to a first one of said chambers, a series of ports in said first chamber extending from the vicinity of said ignition means to a position in proximity to a main burner and a series of ports in a plurality of said separate chambers forming a series adapted to extend from a position adjacent to said main burner to a position near a heat responsive element, whereby a flame is established adjacent to the main burner before a flame under the heat responsive element can be established.

17. A gas pilot assembly comprising a distributor member having a plurality of separate chambers therein, a gas supply tube leading to each of said chambers and a flash tube adapted to extend from a pilot flame to the vicinity of a first one of said chambers, at least one port in said first chamber coacting with said flash tube, a series of ports in said first chamber adapted to extend from the vicinity of said flash tube to a position in proximity to a main burner and a series of ports in a plurality of said separate chambers forming a series adapted to extend from a position adjacent to said main burner to a position near a heat responsive element, whereby a flame is established adjacent to the main burner before a flame under the heat responsive element can be established.

References Cited in the file of this patent
UNITED STATES PATENTS

| Number | Name | Date |
| --- | --- | --- |
| 2,360,607 | Kauffman | Oct. 17, 1944 |
| 2,450,680 | Mueller | Oct. 5, 1948 |
| 2,506,403 | Witzel | May 2, 1950 |
| 2,511,208 | Hornung | June 13, 1950 |